(12) United States Patent
Anzai

(10) Patent No.: US 7,055,043 B2
(45) Date of Patent: May 30, 2006

(54) POWER SYSTEM MANAGEMENT METHOD AND POWER SYSTEM MANAGEMENT SYSTEM

(75) Inventor: Toshio Anzai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 685 days.

(21) Appl. No.: 10/086,831

(22) Filed: Mar. 4, 2002

(65) Prior Publication Data

US 2003/0056130 A1 Mar. 20, 2003

(30) Foreign Application Priority Data

Sep. 14, 2001 (JP) ............................ P2001-280215

(51) Int. Cl.
G06F 1/26 (2006.01)
(52) U.S. Cl. ...................... 713/300; 713/310; 713/320; 713/323; 713/324; 713/340; 700/286; 700/295
(58) Field of Classification Search ................ 700/286, 700/291, 295; 713/300, 310, 320, 323, 324, 713/340
See application file for complete search history.

(56) References Cited

U.S. PATENT DOCUMENTS

| | | | | |
|---|---|---|---|---|
| 4,935,863 A | * | 6/1990 | Calvas et al. .................... 700/9 |
| 4,972,290 A | * | 11/1990 | Sun et al. ....................... 361/64 |
| 5,267,231 A | * | 11/1993 | Dzieduszko ................. 370/216 |
| 5,760,492 A | * | 6/1998 | Kanoi et al. .................... 307/18 |
| 5,793,750 A | * | 8/1998 | Schweitzer et al. .......... 370/242 |
| 5,926,089 A | | 7/1999 | Sekiguchi et al. |
| 5,982,595 A | * | 11/1999 | Pozzuoli ....................... 361/62 |
| 6,011,480 A | * | 1/2000 | Schweitzer et al. .......... 340/644 |
| 6,198,402 B1 | * | 3/2001 | Hasegawa et al. ........... 340/635 |
| 6,285,917 B1 | * | 9/2001 | Sekiguchi et al. ........... 700/239 |
| 6,347,027 B1 | * | 2/2002 | Nelson et al. ................. 361/64 |
| 6,496,342 B1 | * | 12/2002 | Horvath et al. ............... 361/65 |
| 6,535,797 B1 | * | 3/2003 | Bowles et al. ............... 700/286 |
| 6,567,769 B1 | * | 5/2003 | Chang ......................... 702/188 |
| 6,571,153 B1 | * | 5/2003 | Maeda et al. ................ 700/292 |
| 6,618,648 B1 | * | 9/2003 | Shirota et al. ............... 700/291 |

(Continued)

FOREIGN PATENT DOCUMENTS

KR 1995-0013844 11/1995

(Continued)

OTHER PUBLICATIONS

Sekiguchi, Katsuhiko et al., "NC Relay: Protection and Control System applying Internet Technology-Concept", National Meeting of the Japanese Institute of Electrical Engineers in 1999, 6-462, 1601.

(Continued)

Primary Examiner—Lynne H. Browne
Assistant Examiner—Nitin C. Patel
(74) Attorney, Agent, or Firm—Sughrue Mion, PLLC

(57) ABSTRACT

Function of an equipment control apparatus is changed from outside of the equipment control apparatus by means of a communication method of higher security than that of a monitoring system operating via a Web communication net: the equipment control apparatus being provided on the side of facility equipments constituting a power system and controlling the facility equipments; and the monitoring control apparatus being provided outside of the equipment control apparatus and obtaining internal information about the equipment control apparatus via the Web communication net to monitor a state of the power system from the internal information.

17 Claims, 9 Drawing Sheets

U.S. PATENT DOCUMENTS

| | | | |
|---|---|---|---|
| 6,636,893 B1* | 10/2003 | Fong | 709/223 |
| 6,845,301 B1* | 1/2005 | Hamamatsu et al. | 700/292 |
| 2002/0107615 A1* | 8/2002 | Bjorklund | 700/286 |
| 2004/0010350 A1* | 1/2004 | Lof et al. | 700/292 |
| 2004/0162642 A1* | 8/2004 | Gasper et al. | 700/286 |
| 2005/0055137 A1* | 3/2005 | Andren et al. | 700/291 |

FOREIGN PATENT DOCUMENTS

| KR | 2001-0020018 | 3/2001 |
|---|---|---|

OTHER PUBLICATIONS

Shimoo, Manubu et al., "NC Relay: Protection and Control System Applying Internet Technology-Architecture", National Meeting of the Japanese Institute of Electrical Engineers in 1999, 6-463, 1602.

Shirota, Yoshihiro et al, "NC Relay: Protection and Control System applying Internet technology-Application", National Meeting of the Japanese Institute of Electrical Engineers in 1999, 6-464, 1603.

* cited by examiner

POWER SYSTEM MANAGEMENT METHOD AND POWER SYSTEM MANAGEMENT SYSTEM

BACKGROUND OF THE INVENTION

1. Technical Field

The present invention relates to a power system management method and to a power system management system for changing a function of equipment control apparatus, in a power system comprising an equipment control apparatus provided on the side of facility equipments constituting the power system and controlling the mentioned facility equipments, and a monitoring control apparatus provided outside of the mentioned equipment control apparatus and receiving internal information about the mentioned equipment control apparatus via a web communication net thereby monitoring states of the mentioned power system on the basis of the mentioned internal information.

2. Background Art

Hitherto, management of a power system has been carried out in the following manner. For example, any maintenance man who opens a relay board and inspecting it conducts maintenance of the relay board. Also, a relay board manufacturer directly setting and operating the relay board conducts setting change of a relay and the like accompanied with change and expansion of a scale of the system.

It is a recent trend that, engineering developments have been increasing in the direction of carrying out power system management such as maintenance monitoring, setting change and the like by means of a remote electronic terminal employing a Web. One of such examples is described in the specification of the Japanese Patent Application No. 199262/2000 filed by the applicant in Japan on Jun. 30, 2000.

FIG. 9 is a schematic view shown in relation to the specification of the Japanese Patent Application No. 199262/2000, and which shows a system concept. In this system, the relay board is accessed via a Web communication net from the electronic terminal on the side of supplying a product such as facility equipments constituting the power system and a protection control apparatus protecting and controlling the facility equipments. Then, the maintenance monitoring and change in relay setting is carried out from the electronic terminal on the side of power supply and the electronic terminal on the side of supplying the facility equipments constituting the power system. As a result of the mentioned system constitution, the maintenance monitoring and the setting change are efficiently performed on a display screen from a remote place.

It is certain that, in such a system, the relay board is accessed via the Web communication net from the electronic terminal on the side of the power supply and the electronic terminal on the side of the product supply, and further the power system management such as maintenance monitoring, relay setting change, writing of a relay function program or the like is carried out from the electronic terminal on the side of the power supply and the electronic terminal on the side of the product supply, whereby the management such as maintenance monitoring or setting change can be efficiently carried out on the display screen from a remote place. But it is possible that the electronic terminal is commonly used by both of the persons in charge of maintenance monitoring and relay setting change, and the persons in charge of the other work. Further, it is possible for those other persons to easily access to any electronic terminal in the case of being on the Web communication net. As a result, there is a possibility that any other persons not in charge of the maintenance monitoring and the relay setting change may unwillingly change the relay setting due to simple key manipulation mistake and the like. Moreover, it is possible that any information regarding the power system state be changed, which may lead to a significant problem or accident in terms of system operation.

SUMMARY OF THE INVENTION

The present invention was made to solve such undesirable problems, and has an object of providing a power system management method and a power system management system capable of preventing devices such as relay from being easily changed in setting due to manipulation mistake or the like on a display screen of an electronic terminal by the persons not in charge of maintenance monitoring and relay setting change, or from being changed in information about the power system state. That is, an object of the invention is not to bring the power system into any undesirable management state.

A power system management method according to the invention comprises a step of changing function of an equipment control apparatus from outside of the mentioned equipment control apparatus by means of a communication method of higher security than that of a monitoring system operating via a Web communication net:

said equipment control apparatus being provided on the side of facility equipments constituting a power system and controlling the mentioned facility equipments; and said monitoring control apparatus being provided outside of the mentioned equipment control apparatus and obtaining internal information about the mentioned equipment control apparatus via the Web communication net to monitor a state of the mentioned power system from the mentioned internal information.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from outside of the mentioned equipment control apparatus. Furthermore, it can be prevented that any other person not in charge of changing the function of the mentioned equipment control apparatus may unwillingly change the function of the mentioned equipment control apparatus.

In the mentioned power system management method according to the invention, it is preferable that using a communication line different from the mentioned Web communication net carries out a communication of higher security than that of the monitoring system operating via the mentioned Web communication net.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from outside of the mentioned equipment control apparatus as a matter of course. Furthermore, as compared with the case of changing the function of the mentioned equipment control apparatus via the mentioned Web communication net, it can be more securely prevented that any other person not in charge of changing the function of the mentioned equipment control apparatus may unwillingly change the function of the mentioned equipment control apparatus.

In the mentioned power system management method according to the invention, it is preferable that after conducting a confirmatory communication via the mentioned communication line, the function of the mentioned equipment control apparatus is changed via the mentioned Web communication net from outside of the mentioned equipment control apparatus.

As a result of such arrangement, there are the following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from outside of the mentioned equipment control apparatus as a matter of course. Furthermore, as compared with the case of simply changing the function of the mentioned equipment control apparatus via the mentioned Web communication net, it can be more securely prevented that any other person not in charge of changing the function of the mentioned equipment control apparatus may unwillingly change the function of the mentioned equipment control apparatus.

In the mentioned power system management method according to the invention, it is preferable that, as to the function of the equipment control apparatus exerting any effect at least on operation of the power system, the function of the mentioned equipment control apparatus is changed from outside of the mentioned equipment control apparatus via the mentioned communication line.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from outside of the mentioned equipment control apparatus as a matter of course. Furthermore, as compared with the case of changing the function of the mentioned equipment control apparatus via the mentioned Web communication net, it can be more securely prevented that any other person not in charge of changing the function of the mentioned equipment control apparatus may unwillingly change the function of the mentioned equipment control apparatus.

In the mentioned power system management method according to the invention, it is preferable that the function of the mentioned equipment control apparatus is changed from at least one of a product supply-side base that supplies at least one of the mentioned facility equipments and the mentioned equipment control apparatus, and a power supply-side base.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from at least one of the mentioned product supply-side base and power supply-side base. Furthermore, it can be prevented that any other person not in charge of changing the function of the mentioned equipment control apparatus may unwillingly change the function of the mentioned equipment control apparatus.

In the mentioned power system control method according to the invention, it is preferable that an equipment control apparatus, comprising an internal memory to which access is performed via the mentioned communication line for changing the function of mentioned equipment control apparatus and a common memory to which access is performed via the mentioned Web communication net, is used as the mentioned equipment control apparatus.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from outside of the mentioned equipment control apparatus. Furthermore, it can be prevented that any other person not in charge of changing the function of the mentioned equipment control apparatus may unwillingly change the function of the mentioned equipment control apparatus via the mentioned Web communication net.

A power system management system according to the invention comprises:

an equipment control apparatus that is provided on the side of facility equipments constituting a power system and controls the mentioned facility equipments; and a monitoring control apparatus that is provided outside of the mentioned equipment control apparatus and obtains internal information about the mentioned equipment control apparatus operating via a Web communication net to monitor a state of the mentioned power system from the mentioned internal information;

wherein a communication system of higher security than that of the monitoring system operating via the mentioned Web communication net is further provided so that the mentioned equipment control apparatus is changed in function from outside of the mentioned equipment control apparatus by means of an electronic terminal of at least one of a product supply-side base that supplies at least one of the mentioned facility equipments and the mentioned equipment control apparatus, and a power supply-side base.

As a result of such arrangement, there are following advantages. The internal information regarding the mentioned equipment control apparatus can be obtained and the state of mentioned power system can be monitored with this internal information from outside of mentioned equipment control apparatus. Further, the function of the mentioned equipment control apparatus can be changed from at least one of the mentioned product supply-side base and power supply-side base. Furthermore, it can be prevented that any other person not in charge of changing the function of the mentioned equipment control apparatus may unwillingly change the function of the mentioned equipment control apparatus.

In the mentioned power system management system according to the invention, it is preferable that as a communication line used in a communication system of higher security than that of the monitoring system operating via the mentioned Web communication net, a dedicated line is built between the electronic terminal of at least one of the mentioned product supply-side base and power supply-side base, and the mentioned equipment control apparatus.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from at least one of the mentioned product supply-side base and power supply-side base. Furthermore, as compared with the case of changing the function of the mentioned equipment control apparatus via the mentioned Web communication net, it can be more securely prevented that any other person not in charge of changing the function of the mentioned equipment control apparatus may unwillingly change the function of the mentioned equipment control apparatus.

In the power system management system according to the invention, it is preferable that the mentioned equipment control apparatus includes a function enabling to change the function of the mentioned equipment control apparatus via the mentioned Web communication net from outside of the mentioned equipment control apparatus after conducting a confirmatory communication via the mentioned communication system.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from at least one of the mentioned product supply-side base and power supply-side base. Furthermore, as compared with the case of simply changing the function of the mentioned equipment control apparatus via the mentioned Web communication net, it can be more securely prevented that any other person not in charge of changing the function of the mentioned equipment control apparatus may unwillingly change the function of the mentioned equipment control apparatus.

In the mentioned power system management system according to the invention, it is preferable that the function of the equipment control apparatus exerting an effect at least on operation of the power system is changed via the mentioned communication system.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from outside of mentioned equipment control apparatus. Furthermore, it can be prevented that any other person not in charge of changing the function of the mentioned equipment control apparatus may unwillingly change the function of the mentioned equipment control apparatus via the mentioned Web communication net. In this case, it can be securely prevented that the function of the equipment control apparatus, that affects at least the power system operation, is unwillingly changed.

In the mentioned power system management system according to the invention, it is preferable that the mentioned communication line, depending on a switch artificially ON/OFF controlled, makes a connection between the electronic terminal of at least one of the mentioned product supply-side base and power supply-side base, and the mentioned equipment control apparatus.

As a result of such arrangement, there are following advantages. The internal information regarding the mentioned equipment control apparatus can be obtained and the state of mentioned power system can be monitored with this internal information from outside of the mentioned equipment control apparatus. Further, the function of the mentioned equipment control apparatus can be changed from at least one of the mentioned product supply-side base and power supply-side base. As compared with the case of changing the function of the mentioned equipment control apparatus via the mentioned Web communication net, it can be securely prevented that any other person not in charge of changing the function of the mentioned equipment control apparatus may unwillingly change the function of the mentioned equipment control apparatus. Furthermore, depending on the switch artificially ON/OFF controlled, by providing a connection via the mentioned communication line between the electronic terminal of at least on of the product supply-side base and the power supply-side base and the mentioned equipment control apparatus, it can be more securely prevented that any other person not in charge of changing the function of the mentioned equipment control apparatus may unwillingly change the function of the mentioned equipment control apparatus.

In the mentioned power system management system according to the invention, it is preferable that the mentioned switch artificially ON/OFF controlled is provided in at least one of the mentioned product supply-side base and power supply-side base and on the side of the mentioned equipment control apparatus, and depending on any one of those switches, an electronic terminal of at least one of the mentioned product supply-side base and power supply-side base and the mentioned equipment control apparatus are connected to each other.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from at least one of the mentioned product supply-side base and power supply-side base. As compared with the case of changing the function of the mentioned equipment control apparatus via the mentioned Web communication net, it can be securely prevented that any other person not in charge of changing the function of the mentioned equipment control apparatus may unwillingly change the function of the mentioned equipment control apparatus. Furthermore, the mentioned switch artificially ON/OFF controlled, is provided in at least one of mentioned product supply-side base and power supply-side base and on the side of mentioned equipment control apparatus, and depending on any one of these switches, the electronic terminal of at least one of the mentioned product supply-side base and power supply-side base and the mentioned equipment control apparatus are connected to each other via the mentioned communication line. Therefore, in both of at least one of the mentioned product supply-side base and power supply-side base and the mentioned equipment control apparatus, the person in charge of changing the function of the mentioned equipment control apparatus can change the function of the mentioned equipment control apparatus. In addition, it can be securely prevented that any other person not in charge of changing the function of the mentioned equipment control apparatus may unwillingly change the function of the mentioned equipment control apparatus.

In the mentioned power system management system according to the invention, it is preferable that the mentioned switch artificially ON/OFF controlled is provided in each of the mentioned product supply-side base and power supply-side base and on the side of the mentioned equipment control apparatus, and depending on both of one of the switches in the mentioned respective bases and the switch on the side of mentioned equipment control apparatus, one of the electronic terminals of the mentioned respective bases and the mentioned equipment control apparatus are connected to each other.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from at least one of the mentioned product supply-side base and power supply-side base. As compared with the case of changing the function of the mentioned equipment control apparatus via the mentioned Web communication net, it can be securely prevented that any other person not in charge of changing the function of the mentioned equipment control apparatus may unwillingly change the function of the mentioned equipment control apparatus. Furthermore, the mentioned switch artificially ON/OFF controlled is provided at each of the mentioned product supply-side base and power supply-side base and on the side of the mentioned equipment control apparatus, and depending on both of one of the switches of the mentioned respective bases and the switch on the side of the mentioned equipment control apparatus, one of the electronic terminals of the mentioned respective bases and the mentioned equipment control apparatus are connected to each other via the mentioned communication line. Thus, it is not until the agreement reached between either of the mentioned respective bases and the mentioned equipment control apparatus side that the function of the mentioned equipment control apparatus can be changed. Therefore, it can be further securely prevented that any other person not in charge of changing the function of the mentioned equipment control apparatus may unwillingly change the function of the mentioned equipment control apparatus.

In the mentioned power system management system according to the invention, it is preferable that the mentioned switch artificially ON/OFF controlled is provided in each of the mentioned product supply-side base and power supply-side base and on the side of the mentioned equipment control apparatus, and depending on all of the switches in the mentioned respective bases and the switch on the side of mentioned equipment control apparatus, at least one of the electronic terminals of the mentioned respective bases and the mentioned equipment control apparatus are connected to each other.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus can be changed from at least one of the mentioned product supply-side base and power supply-side base. As compared with the case of changing the function of the mentioned equipment control apparatus via the mentioned Web communication net, it can be securely prevented that any other person not in charge of changing the function of the mentioned equipment control apparatus may unwillingly change the function of the mentioned equipment control apparatus. Furthermore, the mentioned switch artificially ON/OFF controlled is provided in each of the mentioned product supply-side base and power supply-side base, and on the side of mentioned equipment control apparatus. Accordingly, depending on all of the switches of the mentioned respective bases and the switch on the side of the equipment control apparatus, at least one of the electronic terminals of the mentioned respective bases and the mentioned equipment control apparatus are connected via the mentioned communication line. Thus, it is not until the agreement reached among the mentioned product supply-side base and the mentioned power supply-side base and the mentioned equipment control apparatus side that the function of the mentioned equipment control apparatus can be changed. Therefore, it can be securely prevented without fail that any other person not in charge of changing the function of the mentioned equipment control apparatus may unwillingly change the function of the mentioned equipment control apparatus.

In the mentioned power system administration system according to the invention, it is preferable that the mentioned equipment control apparatus includes a CPU managing the function thereof, the mentioned CPU including an internal memory and a common memory, the mentioned internal memory being capable of being accessed via the mentioned communication system, and the mentioned common memory being capable of being accessed via the mentioned Web communication net.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus may be changed from at least one of the mentioned product supply-side base and power supply-side base. Furthermore, it can be prevented that any other person not in charge of changing the function of the mentioned equipment control apparatus may unwillingly change the function of the mentioned equipment control apparatus.

In the mentioned power system administration system according to the invention, it is preferable that the common memory is only for reading with respect to the access via the mentioned Web communication net.

As a result of such arrangement, there are following advantages. The internal information regarding the mentioned equipment control apparatus can be obtained and the state of the mentioned power system can be monitored with this internal information from outside of the mentioned equipment control apparatus. Further, the function of the mentioned equipment control apparatus may be changed from at least one of the mentioned product supply-side base and power supply-side base. Furthermore, the common memory is operated only for reading with respect to the access via the mentioned Web communication net, whereby the mentioned common memory cannot be rewritten in such a manner as to change the function of the mentioned equipment control apparatus. Therefore, it can be securely prevented without fail that any other person not in charge of changing the function of the mentioned equipment control apparatus may unwillingly change the function of the mentioned equipment control apparatus.

DESCRIPTION OF THE PREFERRED EMBODIMENTS

Each of preferred embodiments given below describes an example the manner of applying the present invention to a protection control system of a power system, with reference to each block diagram of a system.

Embodiment 1.

Figure 1:
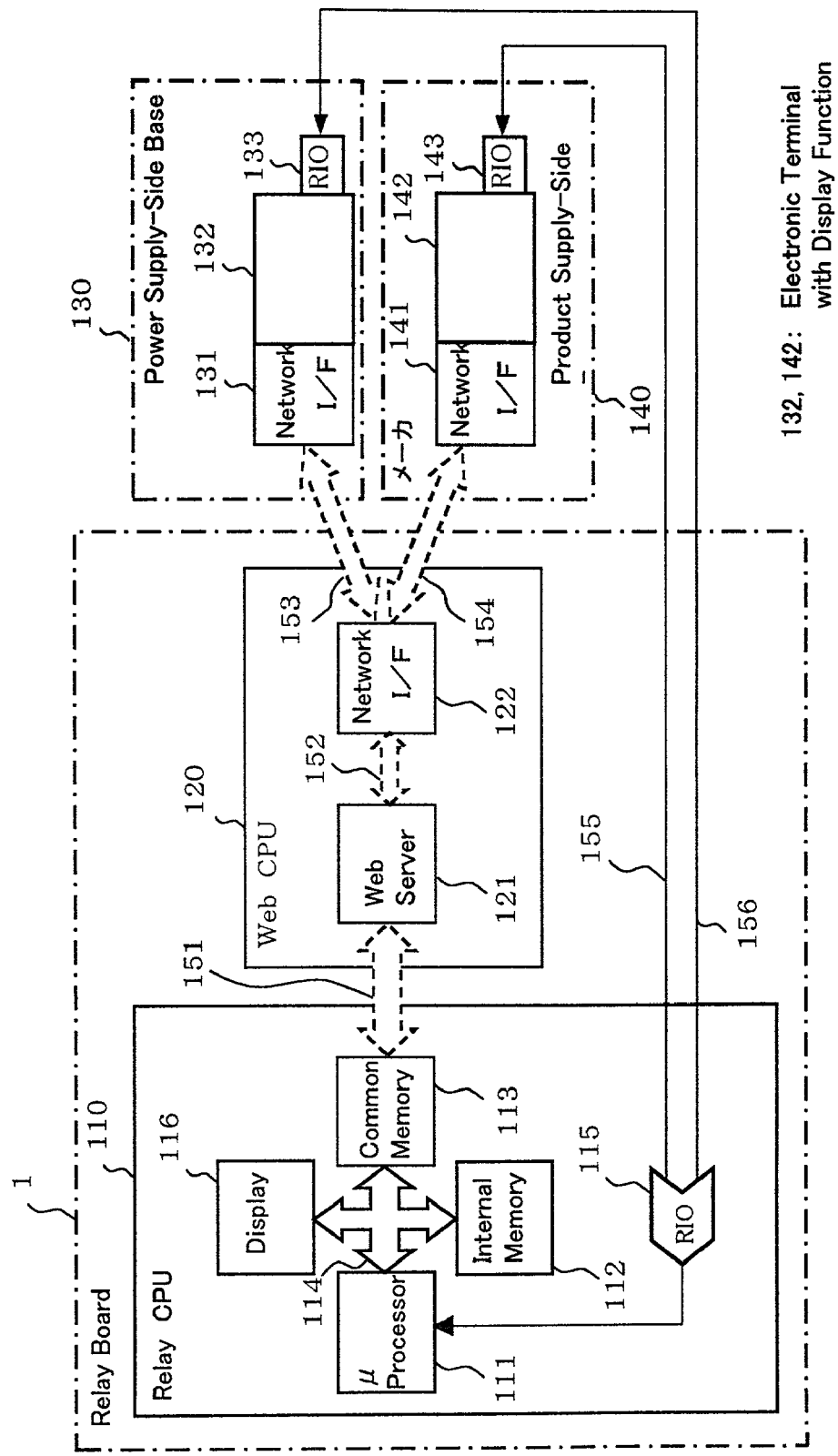
FIG. 1 is a system block diagram schematically showing a first embodiment according to the present invention.

A first embodiment is hereinafter described with reference to FIG. 1. In the drawing, reference numeral 1 designates an equipment control apparatus such as a relay board (hereinafter for convenience sake referred to as "relay board"). Numeral 110 designates a relay CPU, which is comprised of a μ processor 111, an internal memory 112, a common memory 113, a data bus 114 and a RIO (a remote input output apparatus) 115. Further, the mentioned internal memory 112 and the mentioned common memory 113 are respectively comprised of separate individual chips. Numeral 120 designates a Web CPU, which is provided independently of the mentioned relay CPU 110 to serve as a CPU dedicated to a Web communication in a WWW, and comprised of a Web server 121 and a network I/F 122.

Numeral 130 designates a power supply-side base, which is comprised of a network I/F 131, an electronic terminal 132 such as personal computer and a RIO (remote input output apparatus) 133. The power supply-side base 130 mainly has a function of monitoring the power system, and carries out monitoring of a system state such as voltage, current, phase, failure point, failure sort, failure content, load amount and the like in each section of the power system.

Numeral 140 designates a product supply-side base (for example, manufacturer side) supplying to the power supply side any product such as facility equipments constituting the power system and an equipment control apparatus. The product supply-side base 140 is comprised of a network I/F 141, an electronic terminal 142 such as personal computer and a RIO (remote input output apparatus) 143, and mainly has a function of maintaining and managing the equipment such as relay function change and relay setting change. The product supply-side 140, for example, carries out such practical work, in terms of the maintenance and management of the equipment constituting the power system, as preservation, change, addition and partial deletion of the power system function which directly relates to system operation, e.g., packaging, change, addition and partial deletion of relay setting information, relay setting program, relay function execution program and program for loading a relay program and the like.

In addition to the mentioned power supply-side base 130 having the function of the relay function change and relay setting change, the product supply-side base 140 also has a function of monitoring the power system. Therefore, both of the mentioned power supply-side base 130 and product supply-side base 140 serves not only as the monitoring control apparatus but also as the power system management apparatus. However, for reasons of better understanding, numeral 130 is hereinafter referred to as the power supply-side base, and numeral 140 is referred to as the product supply-side base.

Numeral 151 designates a communication path for carrying out exchange (send and receive) of information between the mentioned common memory 113 in the mentioned relay CPU 110 and the mentioned web sever 121 in mentioned Web CPU 120, which path is an internal bus located in the mentioned relay board 1. Numeral 152 designates the communication path for carrying out the exchange of information between the mentioned Web sever 121 and the mentioned network I/F 122, which path is an internal bus located in the mentioned Web CPU 120.

Numeral 153 designates a communication path for carrying out the exchange of information between the network I/F 122 in the mentioned Web CPU 120 and the network I/F 131 in the mentioned power supply-side base 130, and the path serves as a Web communication net in the WWW (hereinafter referred to as "Web communication net 153"). Numeral 154 designates a communication path for carrying out the exchange of information between the mentioned network I/F 122 and the network I/F 141 in the mentioned product supply-side base 140, which path is a Web communication net in the WWW (hereinafter referred to as "Web communication net 154"). In the foregoing description, the network I/F 122 is connected to the Web communication net 154. However, it is also preferable that due to an intra-company communication infrastructure, the Web communication net 153 is connected via, e.g., a proxy server to the Internet, and further connected via the Web communication net within the manufacturer (equivalent to 154) to the product supply-side base 140.

Numeral 155 designates a communication path for carrying out the exchange of information between the RIO 115 in the mentioned relay CPU 110 and the RIO 143 in the mentioned product supply-side base 140. The communication path 155 is a dedicated communication path independent of the mentioned Web communication nets 153, 154, which path is to be referred to as dedicated line or security line. Numeral 156 designates a communication path for carrying out the exchange of information between the RIO 115 in the mentioned relay CPU 110 and the RIO 133 in the mentioned power supply-side base 130. The communication path 156 is an dedicated path independent of the mentioned Web communication nets 153, 154, which path is to be referred to as dedicated line or security line.

A relay program managing a relay function is packaged into the mentioned relay CPU 110, and the mentioned Web server 121 is packaged into the mentioned web CPU 120. Further, the mentioned relay function is roughly connected to the mentioned Web server 121 so as to be capable of being operated only by the mentioned relay CPU 110 irrespective of presence or absence of the mentioned Web sever 121. All data or program necessary for the operation of the mentioned relay function is packaged into the internal memory 112 of the mentioned relay CPU 110. Transfer of data between the mentioned relay CPU 110 and the mentioned Web server 121 is conducted via a dedicated memory such as mentioned common memory 113 so that the mentioned Web server 121 may not be capable of directly accessing to the data and program within the mentioned relay CPU 110.

It is preferable that information necessary for monitoring the system state such as the voltage, current, phase, failure point, failure sort, failure content, load amount and the like in each section of the power system, is processed in the following manner. That is, the information may be downloaded from the mentioned internal memory 112 into the mentioned common memory 113 to be stored in the common memory 113 by the operation of the mentioned μ processor 111, or may be directly stored into the mentioned common memory 113 without downloading from the mentioned internal memory 112. Furthermore, any information or program exerting a significant effect on the system operation such as relay setting information, relay setting program, relay function execution program (also referred to as relay program) and program for loading the relay program and the like, is not stored in the mentioned common memory 113 but in the mentioned internal memory 112.

Next, with respect to delivery method of the information regarding the monitoring system for monitoring the system state such as voltage, current, phase, failure point, failure sort, failure content, load amount and the like, and transfer of the information regarding the equipment maintenance management control system for carrying out such practical work in terms of maintenance and management of the equipment constituting the power system as preservation, change, addition, partial deletion and the like of the power system function which directly relates to the system operation including packaging, change, addition, partial deletion and the like of the relay setting information, relay setting program, relay function execution program, program for loading the relay program and the like, the following three methods for applying the invention are now illustratively described.

Method 1. (Web Communication Net-dependent Method)

First, transfer of the information about the monitoring system carrying out the monitoring of the system state, e.g., the foregoing voltage, current, phase, failure point, failure content, load amount and the like is carried out via the mentioned Web communication nets 153, 154 between at least one of the mentioned power supply-side base 130 and the mentioned product supply-side base 140 and the mentioned common memory 113. A state such as voltage, current, phase, failure point, failure sort, failure content, load mount and the like in each section of the power system can be monitored on a display screen of at least one of an electronic terminal 132 equipped with a display function in the mentioned power supply-side base 130 and an electronic terminal 142 equipped with a display function in the mentioned product supply-side base 140.

Subsequently, practical work in terms of maintenance and management of the equipment constituting the power system such as preservation, change, addition, partial deletion and the like of the power system function, which directly relates to the system operation, including packaging, change, addition, partial deletion and the like of the relay setting information, relay setting program, relay function execution program, program for loading the relay program and the like, is conducted as follows. First it is confirmed that the practical work is carried out via the mentioned dedicated lines 155, 156 between at least one of the power supply-side base 130 and the mentioned product supply-side base 140 carrying out this practical work and the mentioned relay CPU 110. Then entry of the mentioned practical work is executed from at least one of the electronic terminal 132 equipped with the display function in the mentioned power supply-side base 130 and the electronic terminal 142 equipped with the display function in the mentioned product supply-side base 140. This entry information is first stored into the common memory 113 via the mentioned Web communication nets 153, 154. When any confirmation information about carrying out the mentioned work has been previously entered, this entry information is downloaded to the mentioned internal memory 112, and the mentioned packaging, change, addition, partial deletion and the like is executed.

Method 2. (Dedicated Line-dependent Method)

First, transfer of the information about the monitoring system carrying out the monitoring of a system state including the mentioned voltage, current, phase, failure point, failure sort, failure content, load amount and the like is conducted via the mentioned Web communication nets 153, 154 between at least one of the mentioned power supply-side base 130 and the mentioned product supply-side bases 140 and the mentioned common memory 113. A state of voltage, current, phase, failure point, failure sort, failure content, load amount and the like in each section of the power system can be watched on the display screen of at least one of the electronic terminal 132 equipped with the display function in the mentioned power supply-side base 130 and the electronic terminal 142 equipped with the display function in the mentioned product supply-side base 140.

Next, practical work in terms of maintenance and management of the equipment constituting the power system such as preservation, change, addition, partial deletion and the like of the power system function which directly relates to the system operation including packaging, change, addition, partial deletion and the like of the relay setting information, relay setting program, relay function execution program, program for loading the relay program is conducted in the following manner. First it is confirmed that the practical work is carried out between at least one of the power supply-side base 130 and the mentioned product supply-side base 140 carrying out this work and the mentioned relay CPU 110 via the mentioned dedicated lines 155, 156. Then, when carrying out the entry of the mentioned practical work from at least one of the electronic terminal 132 equipped with the display function in the mentioned power supply-side base 130 and the electronic terminal 142 equipped with the display function in the mentioned product supply-side base 140, this entry information is stored via the mentioned dedicated lines 155, 156 into the mentioned internal memory 112. In this manner, the mentioned packaging, change, addition, partial deletion and the like is executed.

Method 3. (Method Using Both Web Communication Net and Dedicated Line)

First, transfer of the information about the monitoring system monitoring the system state including the mentioned voltage, current, phase, failure point, failure sort, failure content, load amount and the like is carried out via the mentioned Web communication nets 153, 154 between at least one of the mentioned power supply-side base 130 and the mentioned product supply-side base 140 and the mentioned common memory 113. A state of voltage, current, phase, failure point, failure sort, failure content, load amount and the like in each section of the power system can be monitored on the display screen of at least one of the electronic terminal 132 equipped with the display function in the mentioned power supply-side base 130 and the electronic terminal 142 equipped with the display function in the mentioned product supply-side base 140.

Next, It is confirmed that among the practical works in terms of maintenance and management of the equipment constituting the power system such as preservation, change, addition, partial deletion and the like of the power system function which directly relates to the system operation including packaging, change, partial deletion and the like of the relay setting information, relay setting program, relay function execution program, program for loading the relay program and the like, any work which does not exert an effect on the power system operation, for example, a display layout on the display screen is carried out in the following manner. The confirmation of carrying out the practical work is made between at least one of the power supply-side base 130 and the mentioned product supply-side base 140 carrying out the practical work via the mentioned dedicated lines 155, 156, and the mentioned relay CPU 110. When entry of the mentioned practical work is carried out from at least one of the electronic terminal 132 equipped with the display function in the mentioned power supply-side base 130 and the electronic terminal 142 equipped with the display function in the mentioned product supply-side base 140, this entry information is first stored into the common memory 113 via the mentioned Web communication nets 153, 154. When the confirmation information about carrying out the mentioned work has been previously entered, the entry information is downloaded to the mentioned internal memory 112, and then the mentioned packaging, change, addition, partial deletion and the like are carried out.

Subsequently, it is confirmed that among the practical works in terms of maintenance and management of the equipment constituting the power system such as preservation, change, addition, partial deletion and the like of the power system function which directly relates to the system operation including packaging, change, addition, partial deletion and the like of the relay setting information, relay setting program, relay function execution program, program for loading the relay program and the like, any work exerting an effect on the power system operation, for example, a work possible to cause a system failure or a work possible to cause a drop of the system voltage is carried out in the following manner. It is confirmed that such a work is carried out between at least one of the power supply-side base 130 and the mentioned product supply-side base 140 carrying out the practical work and the mentioned relay CPU 110 via the mentioned dedicated lines 155, 156. Then, entry of the mentioned practical work is carried out from at least one of the electronic terminal 132 equipped with the display function in the mentioned power supply-side base 130 and the electronic terminal 142 equipped with the display function in the mentioned product supply-side base 140. Thus, the entry information is stored via the mentioned dedicated lines 155, 156 into the mentioned internal memory 112 resulting in the execution of the mentioned packaging, change, addition, partial deletion and the like.

In addition, relay operation, circuit breaker trip and the like due to generation of any abnormal state of the system such as ground fault or short circuit is automatically carried out by the μ processor 111 and the internal memory 112 located in the mentioned relay CPU 110 being irrelevant to the foregoing methods 1 to 3. In the case of generation of any abnormal state in the system such as ground fault or short circuit, the execution of the foregoing methods 1 to 3 is stopped or interrupted by the function of the μ processor 111. Reporting of the generation of abnormal state such as ground fault or short circuit as well as the mentioned interruption is carried out by displaying the abnormal state on the display screens of the related electronic terminals 132, 142 and the display 116 of the relay, or by announcing it.

The mentioned Web communication nets 153, 154 serving as communication system are general-purpose communication nets. Therefore, it is certain that capital investment cost, maintenance cost and the like for the communication system becomes rather inexpensive, but the Web communication nets can also be accessed from any place other than the mentioned power supply-side base 130 and the mentioned product supply-side base 140. On the other hand, the mentioned dedicated lines 155, 156 serving as communication system are provided independently of the communication system of the mentioned Web communication nets 153, 154 and arranged so as to carry out the transfer of information via the mentioned individual RIOs 115, 133, 143. Therefore, the dedicated lines 155, 156 can be accessed only from the mentioned power supply-side base 130 and the mentioned product supply-side base 140 thereby providing an extremely higher reliability in view of security. Further, the communication system is superior in strength and hardly breaks down resulting in an extremely high reliability in terms of soundness of the line.

From the technological viewpoint, what has been described above can be summarized as follows:

1. The above-described power system management method and system comprises: an equipment control apparatus (a relay board, a substation control device, a power generation control device and the like) 1 which is provided on the side of facility equipments constituting a power system and controls the mentioned facility equipments; and a monitoring control apparatus (electronic terminals 132, 142 and the like) which is provided outside of the mentioned equipment control apparatus 1 and obtains internal information about the mentioned equipment control apparatus 1 via Web communication nets 153, 154 for monitoring a state of the mentioned power system from the mentioned internal information; wherein the mentioned equipment control apparatus 1 is changed in function from outside of the mentioned equipment control apparatus 1 (a power supply-side base 130, a product supply-side base 140 and the like) by means of a communication method of higher security than the monitoring system via the mentioned Web communication net. As a result of such arrangement, from outside of the mentioned equipment control apparatus 1, the internal information regarding the mentioned equipment control apparatus 1 can be obtained and the state of the mentioned power system can be monitored with this internal information. Further, function of the mentioned equipment control apparatus 1 can be changed from outside of the mentioned equipment control apparatus 1. Furthermore, it can be prevented that any other person not in charge of changing the function of the mentioned equipment control apparatus 1 may unwillingly change the function of mentioned equipment control apparatus 1.

2. In the above-described power system management method and system, in addition to the foregoing paragraph 1, it is arranged such that a communication of higher security than the monitoring system via the mentioned Web communication nets 153, 154 can be conducted using communication lines 155, 156 different from the mentioned Web communication nets 153, 154. As a result, from outside of the mentioned equipment control apparatus 1, the internal information regarding the mentioned equipment control apparatus 1 can be obtained and the state of mentioned power system can be monitored with this internal information. Further, the function of the mentioned equipment control apparatus 1 can be changed from outside of the mentioned equipment control apparatus as a matter of course. Furthermore, as compared with the case of changing the function of the mentioned equipment control apparatus 1 via the mentioned Web communication nets 153, 154, it can be more securely prevented that any other person not in charge of changing the function of the mentioned equipment control apparatus 1 may unwillingly change the function of the mentioned equipment control apparatus 1.

3. In the above-described power system management method and system, in addition to the foregoing paragraph 1, it is arranged such that after conducting a confirmation communication via the mentioned communication lines 155, 156, the function of the mentioned equipment control apparatus 1 is changed via the mentioned Web communication nets 153, 154 from outside of the mentioned equipment control apparatus 1. As a result, from outside of the mentioned equipment control apparatus 1, the internal information regarding the mentioned equipment control apparatus 1 can be obtained and the state of mentioned power system can be monitored with this internal information. Further the function of the mentioned equipment control apparatus 1 can be changed from outside of the mentioned equipment control apparatus 1 as a matter of course. Furthermore, as compared with the case of changing the function of the mentioned equipment control apparatus 1 simply via the mentioned Web communication nets 153, 154, it can be more securely prevented that any other person not in charge of changing the function of the mentioned equipment control apparatus 1 may unwillingly change the function of the mentioned equipment control apparatus 1.

4. In the above-described power system management method and system, in addition to the foregoing paragraph 1, it is arranged such that as to the function of the equipment control apparatus 1 at least exerting an effect on operation of the power system, the function of the mentioned equipment control apparatus 1 is changed from outside of the mentioned equipment control apparatus 1 via the mentioned communication lines 155, 156. As a result, from outside of the mentioned equipment control apparatus 1, the internal information regarding the mentioned equipment control apparatus 1 can be obtained and the state of the mentioned power system can be monitored with this internal information. Further the function of the mentioned equipment control apparatus 1 can be changed from outside of the mentioned equipment control apparatus 1 as a matter of course. Furthermore, as compared with the case of changing the function of the mentioned equipment control apparatus 1 via the mentioned Web communication nets 153, 154, as to the function of the mentioned equipment control apparatus 1 at least exerting the effect on the operation of the power system, it can be more securely prevented that any other person not in charge of changing the function of the mentioned equipment control apparatus 1 may unwillingly change the function of the mentioned equipment control apparatus 1.

5. In the above-described power system management method and system, in addition to the foregoing paragraph 1, it is arranged such that the function of the mentioned equipment control apparatus 1 is changed from at least one of the product supply-side base 140, which supplies at least one of the mentioned facility equipments and the mentioned equipment control apparatus 1, and the power supply-side base 130. As a result, from outside of the mentioned equipment control apparatus 1, the internal information regarding the mentioned equipment control apparatus 1 can be obtained, and the state of mentioned power system can be monitored with this internal information. Further the function of the mentioned equipment control apparatus 1 can be changed from at least one of the mentioned product supply-side base 140 and the power supply-side base 130. Furthermore it can be prevented that any other person not in charge of changing the function of the mentioned equipment control apparatus 1 may unwillingly change the function of the mentioned equipment control apparatus 1.

6. In the above-described power system management method and system, in addition to the foregoing paragraph 1, it is arranged such that the mentioned equipment control apparatus 1 includes a CPU 110 managing the function thereof, the mentioned CPU 110 including an internal memory 112 and a common memory 113, mentioned internal memory 112 can be accessed via mentioned dedicated lines 155, 156, and the mentioned common memory 113 can be accessed via the mentioned Web communication nets 153, 154. As a result, from outside of the mentioned equipment control apparatus 1, the internal information regarding the mentioned equipment control apparatus 1 can be obtained, and the state of the mentioned power system can be monitored with this internal information. Furthermore, the function of the mentioned equipment control apparatus 1 can be changed from at least one of the mentioned product supply-side base 140 and power supply-side base 130. Further it can be prevented that any other person not in charge of changing the function of the mentioned equipment control apparatus 1 may unwillingly change the function of the mentioned equipment control apparatus 1 via the mentioned Web communication nets 153, 154

7. In the above-described power system management system, it is arranged such that the common memory 113 is used only for reading with respect to the access via the mentioned Web communication nets 153, 154. As a result, the mentioned common memory 113 cannot be rewritten so as to change the function of the mentioned equipment control apparatus 1 by the access via the mentioned Web communication nets 153, 154. Therefore it can be more securely prevented that any other person not in charge of changing the function of the mentioned equipment control apparatus may unwillingly change the function of the mentioned equipment control apparatus 1 via the mentioned Web communication net.

Embodiment 2.

Figure 2:
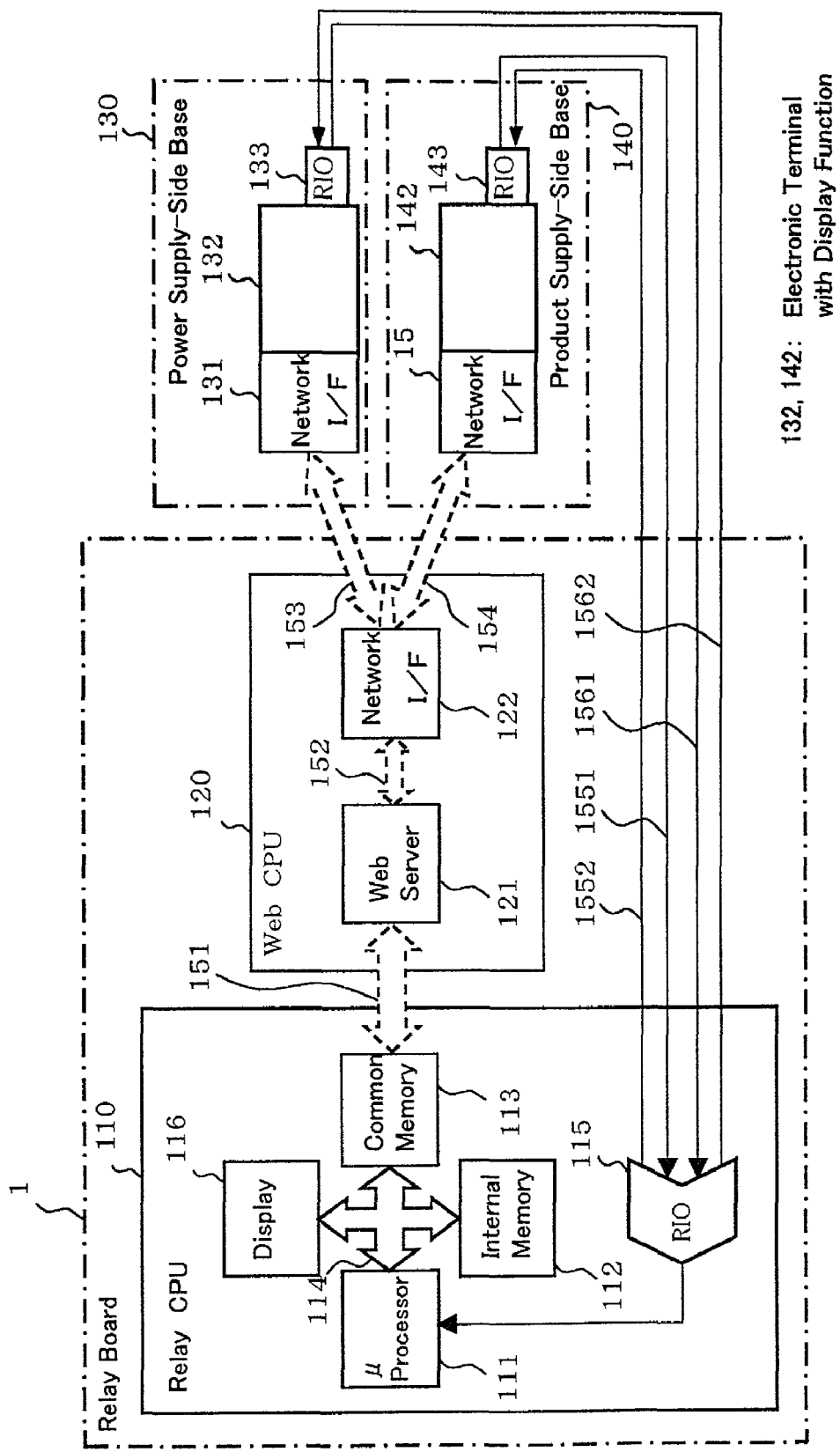
FIG. 2 is a system block diagram schematically showing a second embodiment according to the invention.

Now, a second embodiment is hereinafter described with reference to FIG. 2. In the drawing, reference numerals 1551, 1552 designate dedicated lines between the RIO 143 in the mentioned product supply-side base 140 and the RIO 115 in the mentioned relay CPU 110. Reference numerals 1561, 1562 designate dedicated lines between the RIO 133 in mentioned power supply-side base 130 and the RIO 115 in the mentioned relay CPU 110.

In the case that a request for access has been made from the mentioned product supply-side base 140 to the mentioned relay CPU 110 via the mentioned dedicated line 1551, whether or not such a request for access has been made from the mentioned product supply-side base 140 is confirmed by the mentioned relay CPU 110 side via the mentioned dedicated line 1552. Only after having confirmed that the access request was made from the mentioned product supply-side base 140, the access is permitted to the mentioned product supply-side base 140 via the mentioned dedicated line 1552. The mentioned product supply-side base 140 starts the access after receiving the mentioned permission.

In the same manner, in the case that a request for access to the mentioned relay CPU 110 has been made from the mentioned power supply-side base 130 via the mentioned dedicated line 1561, whether or not such a request for access has been made from the mentioned power supply-side base 130 is confirmed by the mentioned relay CPU 110 side via the mentioned dedicated line 1562. Only after having confirmed that the access request was made from the mentioned power supply-side base 130, the access is permitted to the mentioned power supply-side base 130 via the mentioned dedicated line 1562. The mentioned power supply-side base 130 starts the mentioned access after receiving the mentioned permission.

The remaining arrangement of this second embodiment is the same as the foregoing first embodiment (FIG. 1) and therefore further description thereof is omitted herein. In the same manner, transfer method of information regarding the monitoring system for monitoring the system state such as voltage, current, phase, failure point, failure sort, failure content, load amount and the like, and transfer method of information regarding the equipment maintenance management control system for carrying out such practical works in terms of the maintenance and management of the equipment constituting the power system as preservation, change, addition, partial deletion and the like of the power system function which directly relates to the system operation including packaging, change, addition, partial deletion and the like of the relay setting information, relay setting program, relay function execution program, program for loading the relay program and the like, are also the same as the methods 1 to 3 according to the foregoing first embodiment (FIG. 1), except what is described above being peculiar to this second embodiment, and further description thereof is omitted herein.

In this second embodiment, as described above, there is a protocol in which any access request to the mentioned relay CPU 110 and permission to the access are preliminarily confirmed before starting the access. Therefore, reliability in security becomes higher than that in the case according to the foregoing first embodiment. In addition, in the case that only a read request is made to the mentioned relay CPU, it is preferable that the access to the mentioned relay CPU 110 is permitted without execution of the confirmation via the mentioned dedicated lines 1552, 1562.

Embodiment 3.

Figure 3:
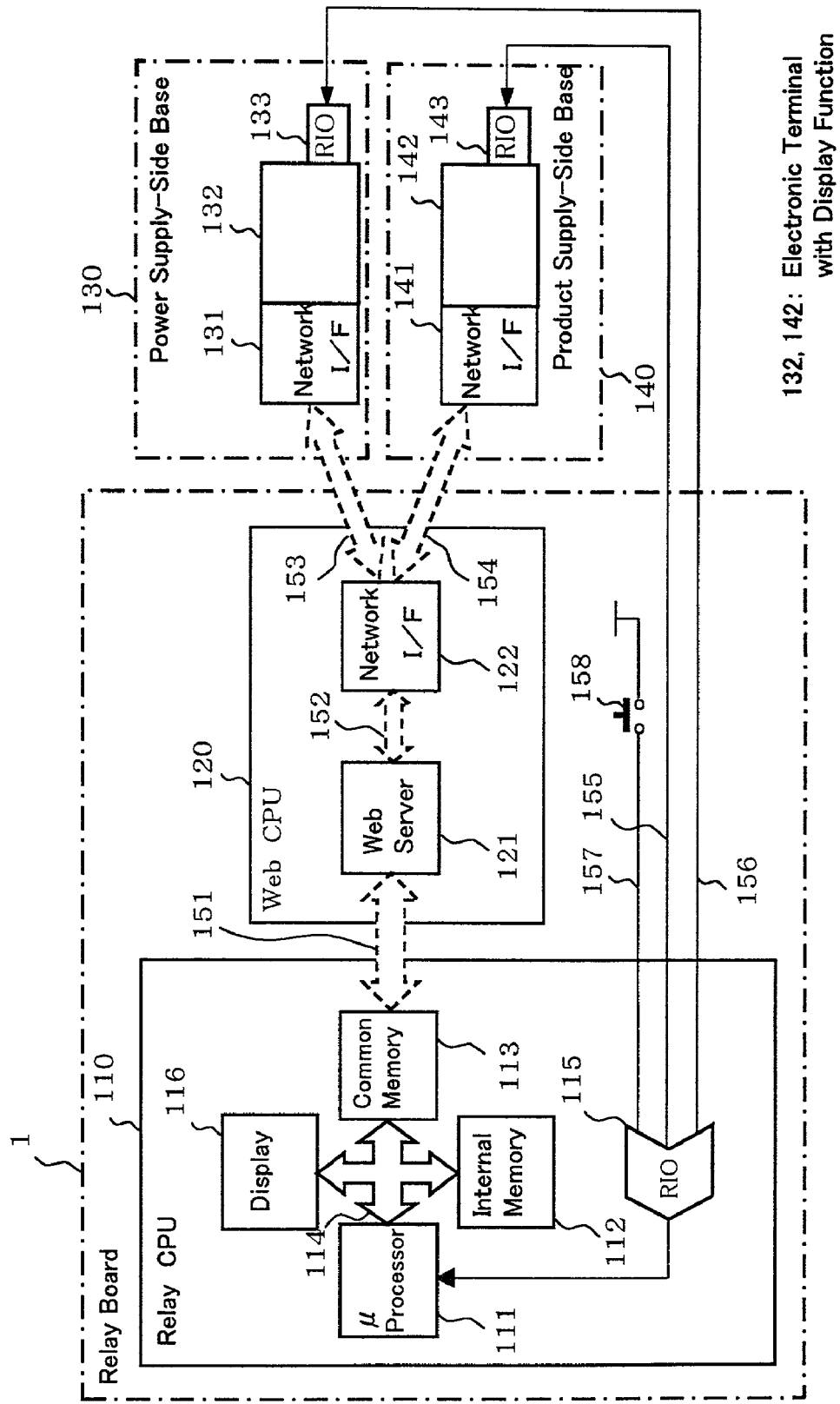
FIG. 3 is a system block diagram schematically showing a third embodiment according to the invention.

Now, a third preferred embodiment is hereinafter described with reference to FIG. 3. In the drawing, reference numeral 157 designates a dedicated signal line channel, and a switch 158 which is artificially ON/OFF controlled is inserted therein. Only in the case of this switch 158 being ON, the mentioned dedicated line 155 is operative, and the RIO 115 on the side of mentioned relay board 1 operates such that transfer of information may be carried out between the electronic terminal 142 in the mentioned product supply-side base 140 and the µ processor 111 in the mentioned relay CPU 110. In the same manner, only in the case of the mentioned switch 158 being ON, the mentioned dedicated line 156 is operative, and the RIO 115 on the side of mentioned relay board 1 operates such that transfer of information may be carried out between the electronic terminal 132 of the mentioned power supply-side base 130 and the mentioned µ processor 111.

Further, the mentioned switch 158 is controlled to turn ON by an agreement reached between the mentioned power supply-side base 130 and an electric power station side provided with the relay board 1, an agreement reached between the mentioned product supply-side base 140 and the electric power station side provided with the mentioned relay board 1, an agreement reached between mentioned power supply-side base 130, mentioned power supply-side base 140 and the electric power station provided with mentioned relay board 1, and the like.

Furthermore, in the case that a request made toward the mentioned relay CPU 111 via the mentioned dedicated lines 155, 156 is a writing request, it is preferable that access to the mentioned relay CPU 110 can be carried out only during the ON state of the mentioned switch 158. It is also preferable that in the case of the request made toward the mentioned relay CPU 110 is only a read request, the access toward the mentioned relay CPU 110 can be carried out irrespective of the ON/OFF state of the mentioned switch 158.

The remaining arrangement of this third embodiment is the same as the foregoing first embodiment (FIG. 1) and therefore further description thereof is omitted herein. In the same manner, transfer method of information regarding the monitoring system for monitoring the system state such as voltage, current, phase, failure point, failure sort, failure content, load amount and the like, and transfer method of information regarding the equipment maintenance management control system for carrying out such practical works in terms of the maintenance and management of the equipment constituting the power system as preservation, change, addition, partial deletion and the like of the power system function which directly relates to the system operation including packaging, change, addition, partial deletion and the like of the relay setting information, relay setting program, relay function execution program, program for loading the relay program and the like, are also the same as the methods 1 to 3 according to the foregoing first embodiment (FIG. 1), except what is described above being peculiar to this third embodiment, and further description thereof is omitted herein.

As described above, in the power system management system according to this third embodiment, the mentioned communication lines 155, 156 are arranged so as to provide a connection between at least one of the electronic terminals 142, 132 respectively of the product supply-side base 140 and the power supply-side base 130 and the mentioned equipment control apparatus (relay board) 1, depending on the switch 158 artificially ON/OFF controlled. Therefore, in addition to the function according to the foregoing first embodiment, at least one of the electronic terminals 132, 142 of the power supply-side base 130 and the mentioned product supply-side base 140 and the mentioned equipment control apparatus 1 are connected to each other, depending on the switch 158 artificially ON/OFF controlled. As a result, it can be further securely prevented that any other person not in charge of changing the function of the mentioned equipment control apparatus 1 may unwillingly change the function of the mentioned equipment control apparatus 1.

Embodiment 4.

Figure 4:
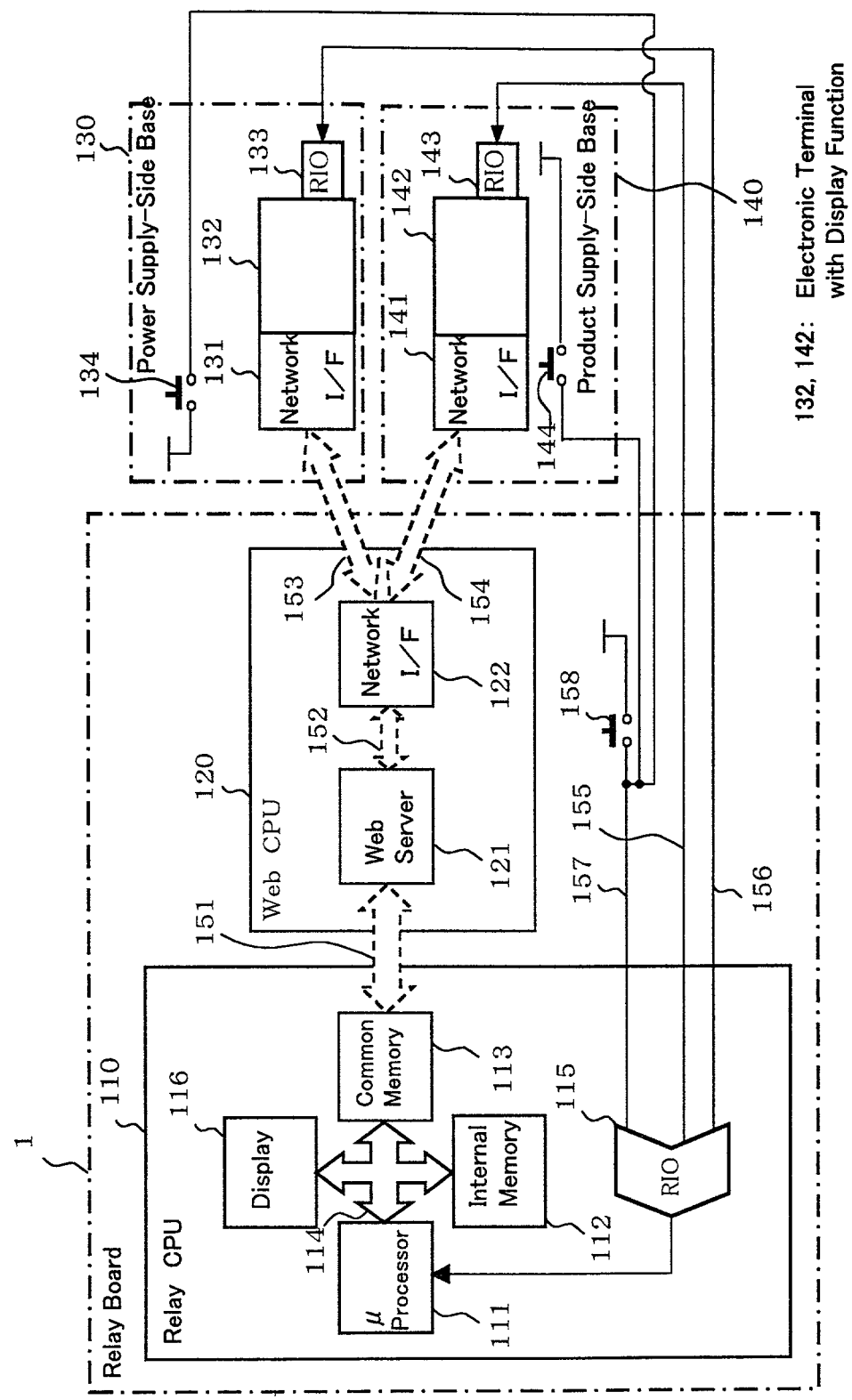
FIG. 4 is a system block diagram schematically showing a fourth embodiment according to the invention.

Now, a fourth embodiment is hereinafter described with reference to FIG. 4. In the drawing, reference numeral 134 designates a switch which is provided in the mentioned power supply-side base 130 and artificially ON/OFF controlled. Numeral 144 designates a switch which is provided in the mentioned product supply-side base 140 and artificially ON/OFF controlled. Either of the mentioned switches 134, 144, as shown in the drawing, is in parallel to the switch 158 which is provided on the side of the mentioned relay board 1 and artificially ON/OFF controlled.

Furthermore, it is arranged such that depending on one of these switches 134, 144, 158, at least one of the electronic terminals 132, 142 respectively of the mentioned power supply-side base 130 and product supply-side base 140, and the mentioned equipment control apparatus (relay board and the like) 1 are connected to each other. In either of at least one of the mentioned power supply-side base 130 and product supply-side base 140 and the mentioned equipment control apparatus 1 side, a person in charge of changing the function of the mentioned equipment control apparatus 1 can change the function of the mentioned equipment control apparatus 1. In addition, it can be securely prevented that any other person not in charge of changing the function of the mentioned equipment control apparatus 1 may unwillingly change the function of the mentioned equipment control apparatus 1.

The remaining arrangement of this fourth embodiment is the same as the foregoing first embodiment (FIG. 1) and therefore further description thereof is omitted herein. In the same manner, transfer method of information regarding the monitoring system for monitoring the system state such as voltage, current, phase, failure point, failure sort, failure content, load amount and the like, and transfer method of information regarding the equipment maintenance management control system for carrying out such practical works in terms of the maintenance and management of the equipment constituting the power system as preservation, change, addition, partial deletion and the like of the power system function which directly relates to the system operation including packaging, change, addition, partial deletion and the like of the relay setting information, relay setting program, relay function execution program, program for loading the relay program and the like, are also the same as the methods 1 to 3 according to the foregoing first embodiment (FIG. 1), except what is described above being peculiar to this fourth embodiment, and further description thereof is omitted herein.

Embodiment 5.

Figure 5:
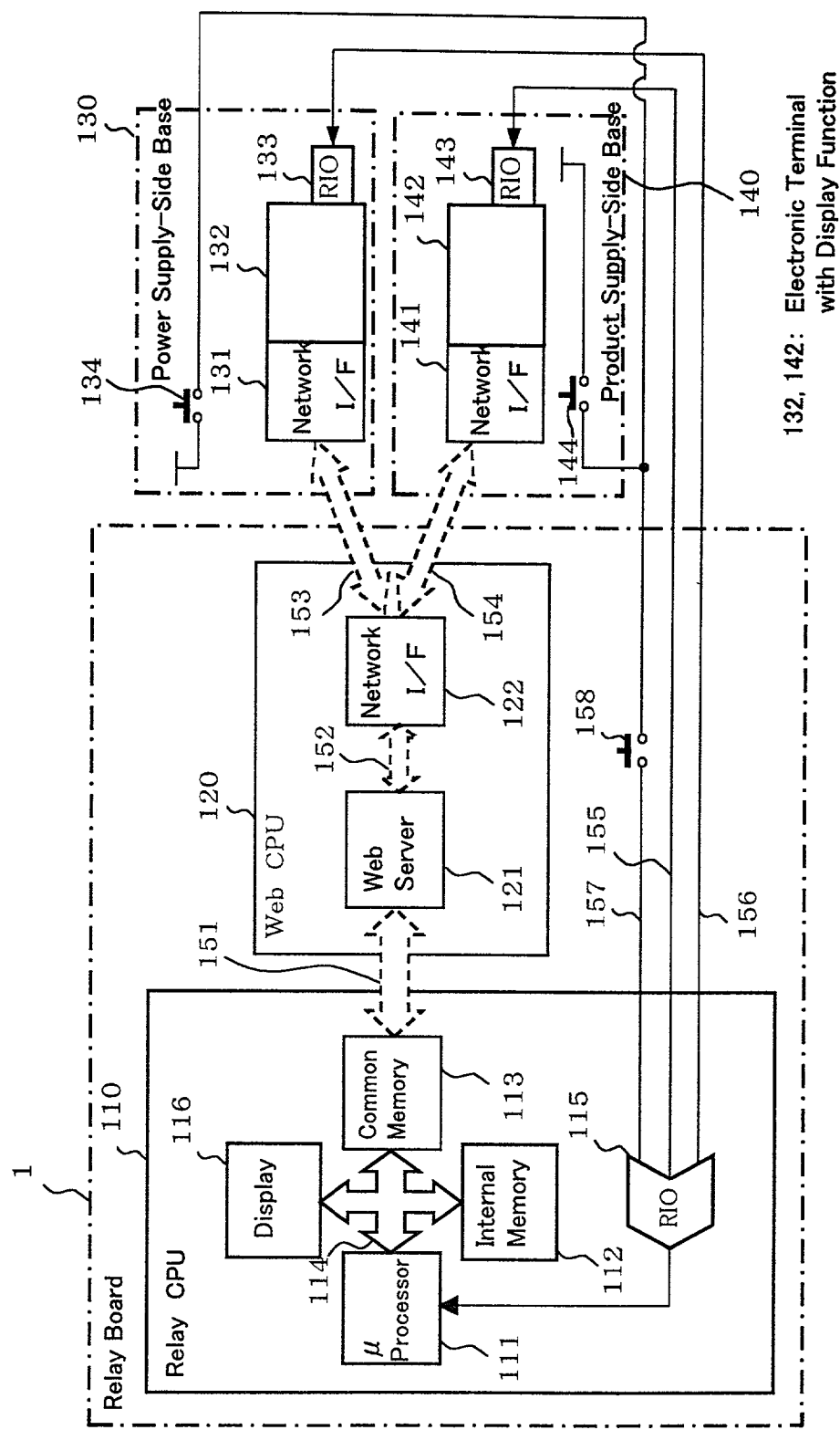
FIG. 5 is a system block diagram schematically showing a fifth embodiment according to the invention.

Now, a fifth embodiment is hereinafter described with reference to FIG. 5. As shown in FIG. 5, the switch 134 which is provided in the mentioned power supply-side base 130 and artificially ON/OFF controlled, is connected in series to the switch 158 which is provided on the side of the mentioned relay board 1 and artificially ON/OFF controlled. Also the switch 144 which is provided in the mentioned product supply-side base 140 and artificially ON/OFF controlled, is connected in series to mentioned switch 158 provided on the side of the mentioned relay board 1. Further, the switch 134 in the mentioned power supply-side base 130 and the switch 144 in the mentioned product supply-side base 140 are in parallel to each other.

In this fifth embodiment, the switch artificially ON/OFF controlled is provided respectively in each of the mentioned power supply-side base 130 and product supply-side base 140 and on the side of mentioned equipment control apparatus 1 (134, 144, 158). Depending on both of one of the switches 134, 144 of the mentioned respective bases 130, 140 and the switch 158 on the side of the mentioned equipment control apparatus 1, one of the electronic terminals 132, 142 in the mentioned respective bases 130, 140 and the mentioned equipment control apparatus 1 are connected to each other via the communication lines 155, 156. Thus, it is not until reaching an agreement between either of the mentioned respective bases 130, 140 and the side of the mentioned equipment control apparatus 1 that the function of the mentioned equipment control apparatus 1 can be changed. Therefore, it can be further securely prevented that any other person not in charge of changing the function of the mentioned equipment control apparatus 1 may unwillingly change the function of the mentioned equipment control apparatus 1.

The remaining arrangement of this fifth embodiment is the same as the foregoing first embodiment (FIG. 1) and therefore further description thereof is omitted herein. In the same manner, transfer method of information regarding the monitoring system for monitoring the system state such as voltage, current, phase, failure point, failure sort, failure content, load amount and the like, and transfer method of information regarding the equipment maintenance management control system for carrying out such practical works in terms of the maintenance and management of the equipment constituting the power system as preservation, change, addition, partial deletion and the like of the power system function which directly relates to the system operation including packaging, change, addition, partial deletion and the like of the relay setting information, relay setting program, relay function execution program, program for loading the relay program and the like, are also the same as the methods 1 to 3 according to the foregoing first embodiment (FIG. 1), except what is described above being peculiar to this fifth embodiment, and further description thereof is omitted herein.

Embodiment 6.

Figure 6:
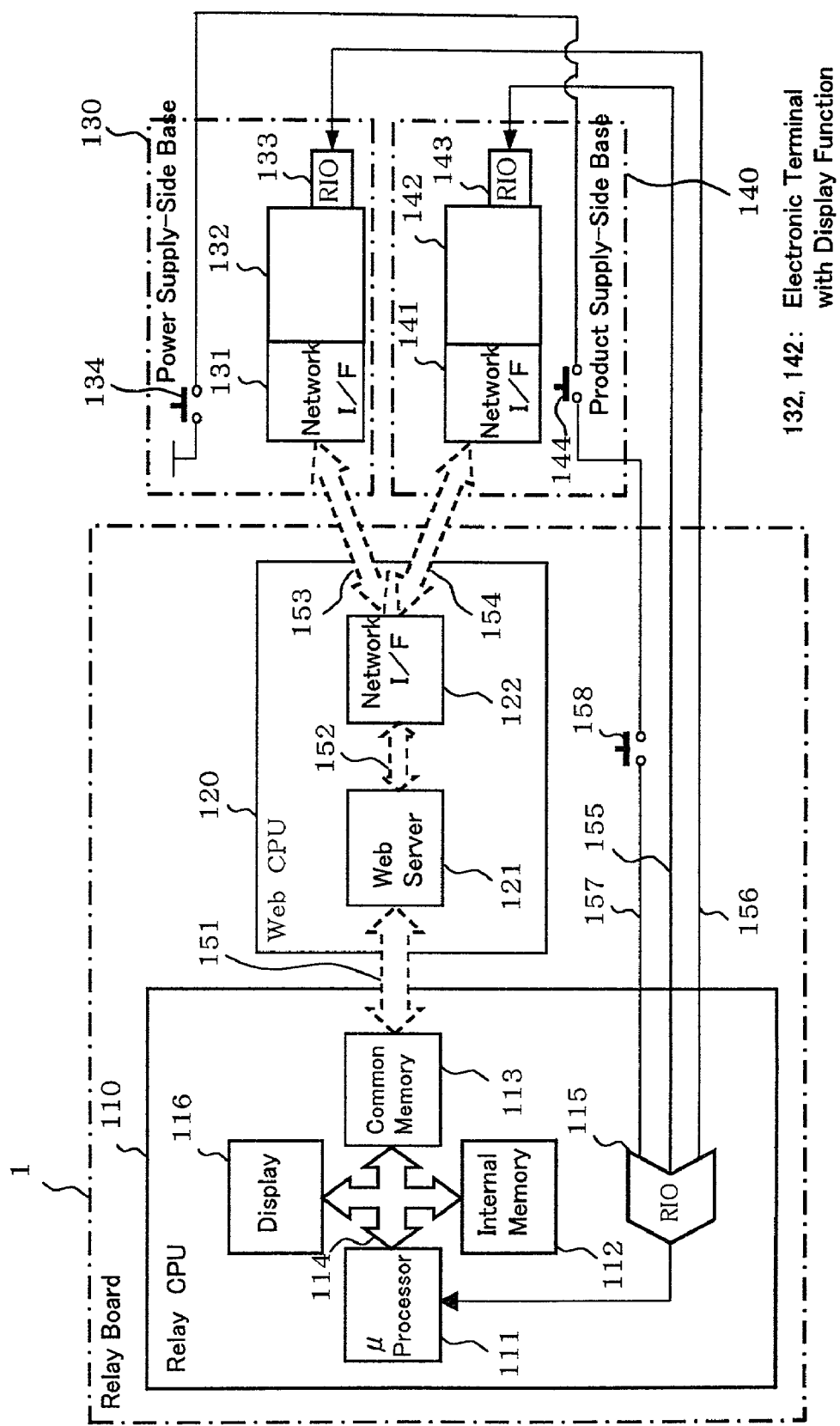
FIG. 6 is a system block diagram schematically showing a sixth embodiment according to the invention.

In a sixth embodiment, as shown in FIG. 6, the switch 134 which is provided in the mentioned power supply-side base 130 and artificially ON/OFF controlled, the switch 144 which is provided in the mentioned product supply-side base 140 and artificially ON/OFF controlled, and the switch 158 which is provided on the side of mentioned relay board 1 and artificially ON/OFF controlled, are all connected in series to one another.

In this sixth embodiment, the mentioned switches artificially ON/OFF controlled are provided in each of the mentioned power supply-side base 130 and product supply-side base 140, and on the side of the mentioned equipment control apparatus (relay board and the like) 1. Depending on all of the switches 134, 144 of the mentioned respective bases 130, 140 and the switch 158 on the side of the mentioned equipment control apparatus 1, at least one of the electronic terminals 132, 142 of the mentioned respective bases 130, 140 and the mentioned equipment control apparatus 1 are connected to each other via the communication lines 155, 156. Thus, it is not until reaching an agreement among the three of the mentioned power supply-side base 130, the mentioned product supply-side base 140 and the side of the mentioned equipment control apparatus 1 that the function of the mentioned equipment control apparatus 1 can be changed. Therefore, it can be securely prevented without fail that any other person not in charge of changing the function of the mentioned equipment control apparatus 1 may unwillingly change the function of the mentioned equipment control apparatus 1.

The remaining arrangement of this sixth embodiment is the same as the foregoing first embodiment (FIG. 1) and therefore further description thereof is omitted herein. In the same manner, transfer method of information regarding the monitoring system for monitoring the system state such as voltage, current, phase, failure point, failure sort, failure content, load amount and the like, and transfer method of information regarding the equipment maintenance management control system for carrying out such practical works in terms of the maintenance and management of the equipment constituting the power system as preservation, change, addition, partial deletion and the like of the power system function which directly relates to the system operation including packaging, change, addition, partial deletion and the like of the relay setting information, relay setting program, relay function execution program, program for loading the relay program and the like, are also the same as the methods 1 to 3 according to the foregoing first embodiment (FIG. 1), except what is described above being peculiar to this sixth embodiment, and further description thereof is omitted herein.

Embodiment 7.

Figure 7:
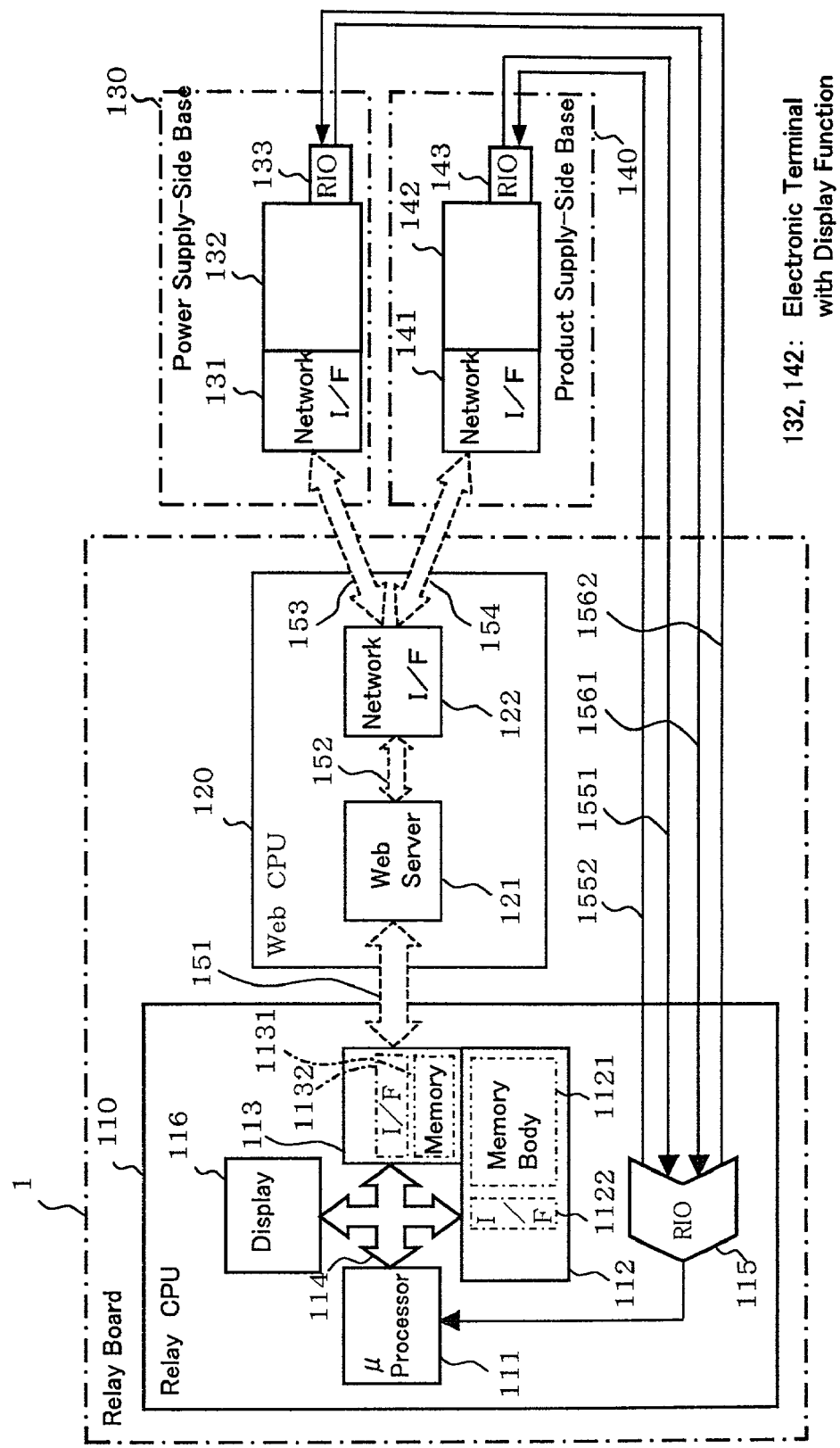
FIG. 7 is a system block diagram schematically showing a seventh embodiment according to the invention.

Now, a seventh embodiment is described with reference to FIG. 7 showing an arrangement in which the internal memory 112 and the common memory 113 in the relay CPU 110 are mounted on the same chip. In the drawing, the mentioned internal memory 112 includes a memory body 1121 and an I/F 1122, and the mentioned common memory 113 includes a memory body 1131 and an I/F 1132. That is, although the mentioned internal memory 112 and common memory 113 are mounted on the same chip, they include separately the memory body and I/F. Accordingly, from the Web server 121 of the mentioned Web CPU 120, access is possible only to the memory body 1131 of the common memory 113 via the I/F 1132 of the common memory 113. In other words, the Web sever 121 of the mentioned Web CPU 120 is connected via a connector (not shown) to the I/F 1132 of the mentioned common memory 113, while being not connected to the I/F 1122 of the mentioned internal memory 112.

The mentioned internal memory 112 and common memory 113 are formed into different chips in the foregoing Embodiments 1 to 6, while they are formed into the same chip in this embodiment 7. What is important is that the internal memory 112 and the Web server 121 are not connected to each other in terms of the communication path (physically separated on the communication path). This makes it impossible to access from the mentioned Web sever 121 to the internal memory 112 in which any program or processing data of the equipment control apparatus such as relay program or live data about the system state are stored. However, in the case of carrying out any access to the common memory 113 from the Web server 121 and any download to the common memory 113 from the internal memory 112 at the same time, there is a possibility that the physical separation on the communication path between the internal memory 112 and the Web sever 121 becomes weak. Supposing that security measures on the S/W are employed together, the reliability will be further improved.

The remaining arrangement of this seventh embodiment is the same as the foregoing first embodiment (FIG. 1) and therefore further description thereof is omitted herein. In the same manner, transfer method of information regarding the monitoring system for monitoring the system state such as voltage, current, phase, failure point, failure sort, failure content, load amount and the like, and transfer method of information regarding the equipment maintenance management control system for carrying out such practical works in terms of the maintenance and management of the equipment constituting the power system as preservation, change, addition, partial deletion and the like of the power system function which directly relates to the system operation including packaging, change, addition, partial deletion and the like of the relay setting information, relay setting program, relay function execution program, program for loading the relay program and the like, are also the same as the methods 1 to 3 according to the foregoing first embodiment (FIG. 1), except what is described above being peculiar to this seventh embodiment, and further description thereof is omitted herein.

Embodiment 8.

Figure 8:
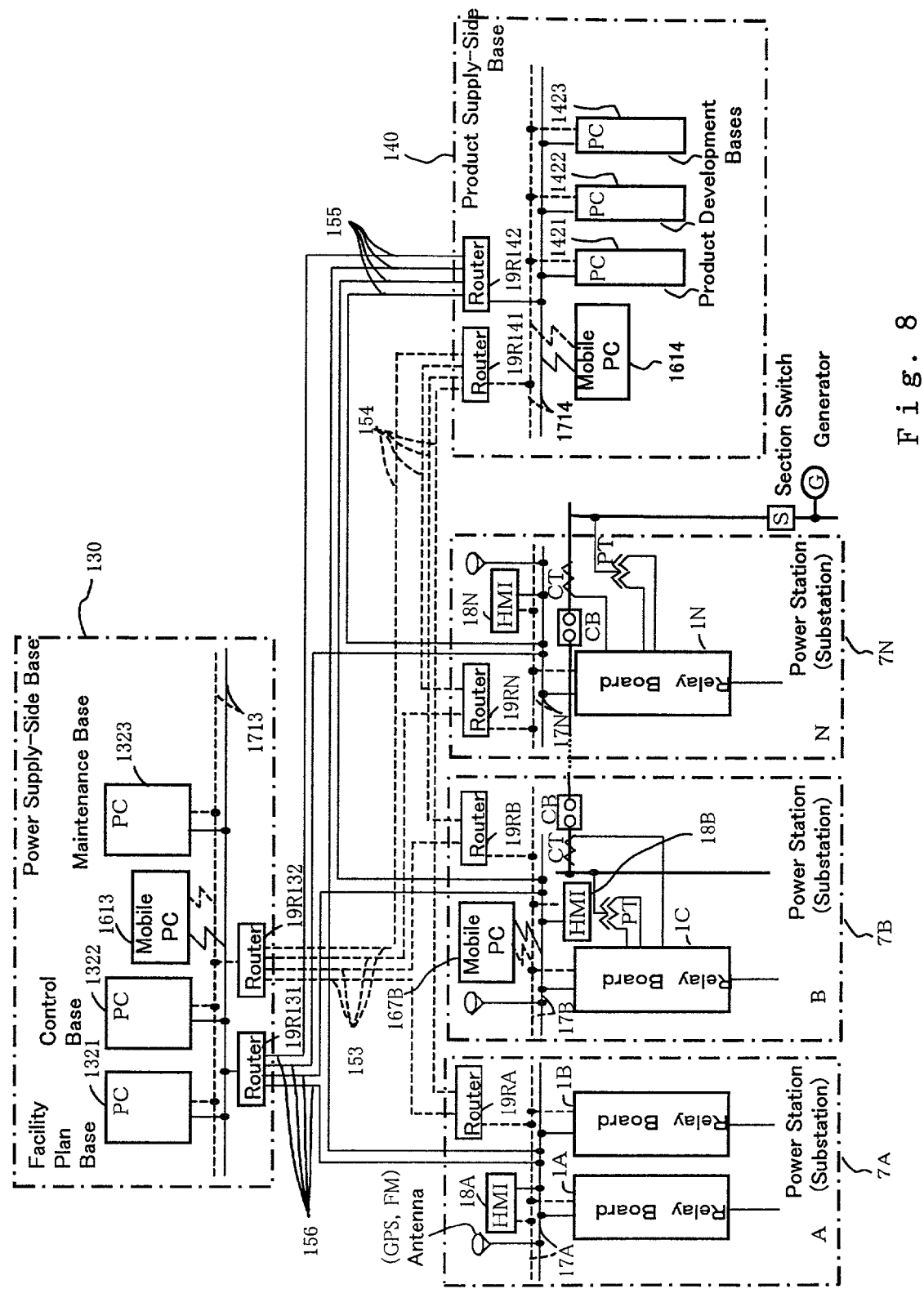
FIG. 8 is a system block diagram schematically showing an eighth embodiment according to the invention.
Figure 9:
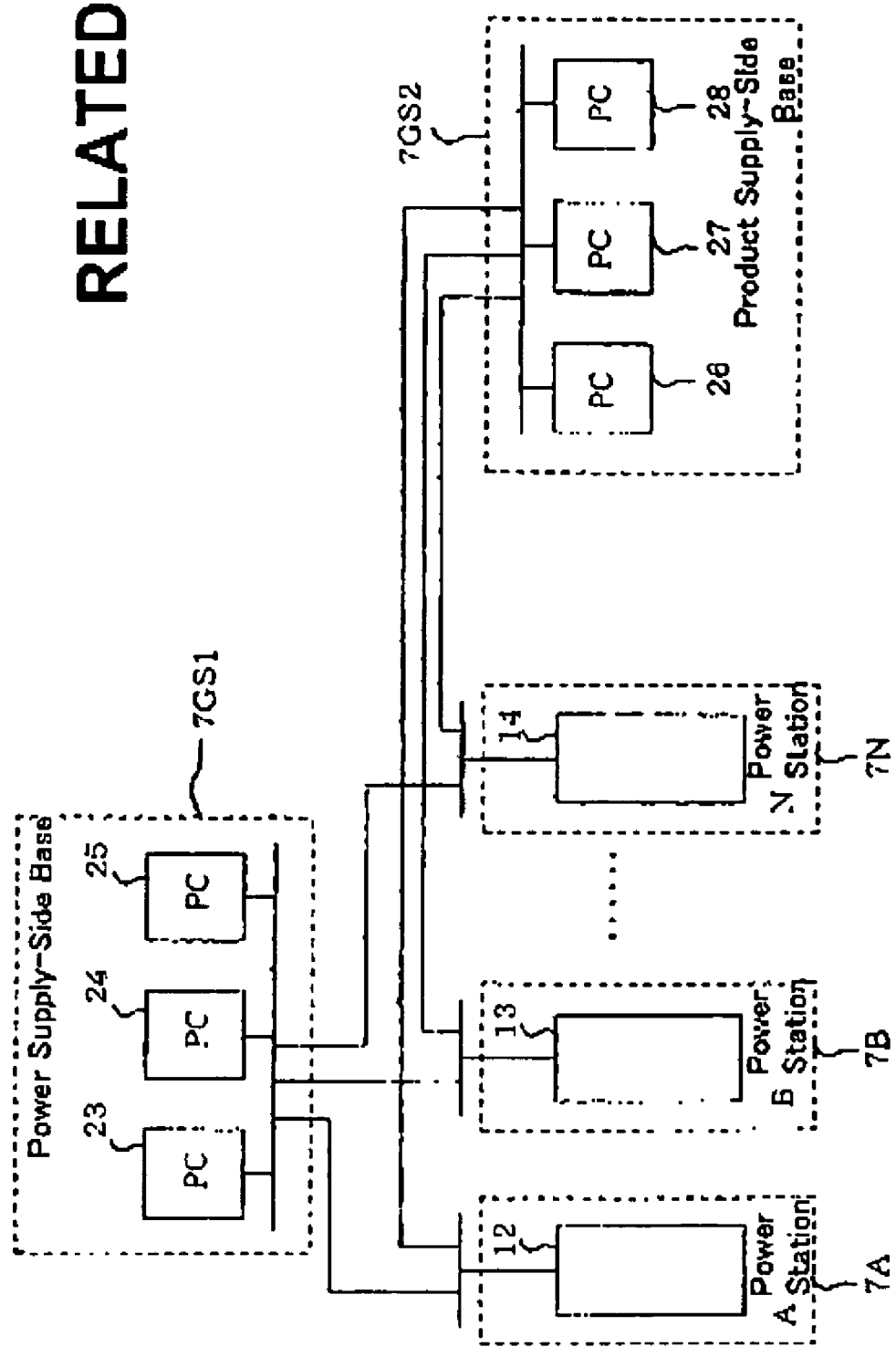
FIG. 9 is a system block diagram schematically showing a system according to the preceding art.

Next, an eighth embodiment is hereinafter described with reference to FIG. 8. FIG. 8 shows a specific example in the case of applying the invention to a protection control system of a power system. In the drawing, reference numerals 7A to 7N designate A, B, C power stations (substations). As shown in the drawing, provided in the station are a transformer (not shown), relay boards (protection relay apparatus) 1A to 1N provided with a protection control function, an a circuit breaker CB, an instrument current transformer CT, an instrument transformer PT, etc. When detecting any fault on a transmission line or a bus, the mentioned relay boards (protection relay apparatus) 1A to 1N trip the circuit breaker CB and at the same time collect information regarding the system state (for example, information showing the ON/OFF state of the circuit breaker CB and a section switch S mounted on the bus, information regarding bus voltage, bus current and zero-phase current, and so on). Then, the relay boards store those collected information as live data information concerning the system state in the internal memory (the internal memory 112 in FIGS. 1 to 7) of the mentioned relay boards (protection relay apparatus) 1A to 1N.

Reference numeral 130 designates a power supply-side base such as central power feeding station, control station, branch, etc. in which a facility plan base, a control base, a maintenance base and the like are provided. Reference numeral 140 designates a product supply-side base where any product such as facility equipments constituting the power system and the control apparatus controlling the mentioned facility equipments is developed, manufactured or marketed. A plurality of product development bases is arranged in this product supply-side base 140. Further, at the mentioned power supply-side base 130, apparatus provision-side base 140, power station (substation) 7B, etc., mobile PCs 167B, 1613, 1614 having substantially the same function as the mentioned electronic terminals 132, 142 are also used.

Numerals 1321 to 1323 designate PCs with display (electronic terminal) such as personal computer that is used at the mentioned power supply-side base 130. Numerals 1421 to 1423 designate PCs with the display (electronic terminal) such as personal computer used at the mentioned product supply-side base 140. A Web browser (not shown) is mounted on each of these PCs (electronic terminals) 1321 to 1323, 1421 to 1423. This Web browser establishes a connection via the Web communication nets 153, 154 to the Web server mounted on the mentioned relay boards 1A to 1N (Web server 121 in FIGS. 1 to 7). Numeral 17A designates a communication line in the mentioned A power station (substation) 7A. Numeral 17B designates a communication line in the mentioned B power station (substation) 7B. Numeral 17N designates a communication line in the mentioned N power station (substation) 7N. Numeral 1713 designates a communication line in the mentioned power supply-side base 130. Numeral 1714 designates a communication line in the mentioned product provision-side base 140.

Numeral 18A designates a Human Machine Interface (hereinafter referred to as HMI) provided in the mentioned A power station (substation) 7A. Numeral 18B designates a HMI provided in the mentioned B power station (substation) 7B. Numeral 18N designates a HMI provided in the mentioned N power station (substation) 7N. Numerals 19RA, 19RB, 19RN, 19R131, 19R132, 19R133, 19R141, 19R142 designate routers. In addition, the Web communication net and the communication line connected to the Web communication net in the station are indicated by dotted lines, while the dedicated line and the communication line connected to the dedicated line in the station being indicated by solid lines.

Now the operation is hereinafter described.

The mentioned relay boards 1A to 1N are mounted with the I/F (interface) capable of collecting system state information, for example, information showing an ON/OFF state of the circuit breaker CB mounted on the bus, and stores the system state information in the internal memory (the internal memory 112 in FIGS. 1 to 7) of the relay boards as live data information concerning the system state.

On the other hand, the mentioned PC 1323 for maintenance provided at the mentioned maintenance base in the mentioned power supply-side base 130 such as power sales company carries out maintenance as follows. For example, in the case of judging on the PC display screen whether or not any transmission line connected to the mentioned A electric power station is in a normal condition, the PC 1323, using the mentioned Web browser (not shown), outputs to the mentioned Web communication net 153 an address information that identifies only the mentioned relay board 1A in the mentioned A electric power station, thereby trying to achieve a connection to the Web server (the Web server 121 in FIGS. 1 to 7) mounted on the mentioned relay board 1A. When the mentioned Web server mounted on the mentioned relay board 1A receives the address information, a connection between this Web server and the Web browser of the mentioned PC 1323 is established.

In this manner, when the connection between mentioned Web browser and the Web server in the mentioned relay board 1A is established, a HTTP communication between the mentioned Web browser and the Web server in the mentioned relay board 1A comes to start. The mentioned PC 1323 for maintenance, using the Web browser, outputs a transmission request for the system state information to the Web server of the mentioned relay board 1A. When receiving the transmission request for the system state information from the mentioned PC 1323 for maintenance via the Web communication net 153, the Web server mounted on the mentioned relay board 1A transfers the system state information, which is downloaded from the internal memory in the mentioned relay board 1A (the internal memory 112 in FIGS. 1 to 7) to the common memory (the common memory 113 in FIGS. 1 to 7), via the mentioned Web communication net 153 to the mentioned PC 1323 for maintenance.

Accordingly, the mentioned PC 1323 for maintenance can judge on the PC display screen whether or not the transmission line connected to the mentioned A power station 7A is in a normal state. In addition, by mounting a Java VM on the mentioned PC 1323 for maintenance, the program or the like for displaying the system state information on the display screen is downloaded via the Web communication net 153 from the mentioned common memory in the mentioned relay board 1A (the common memory 113 in FIGS. 1 to 7) upon execution of the Java. Therefore, it is not necessary for previously installing such a program into the PC 1323.

Described above is the operation in which the system state information downloaded to the common memory in the mentioned relay boards 1A to 1N is obtained using the mentioned Web browser by means of the PC 1323 for maintenance. However, change in the operation setting information of the protection relay apparatus which information is stored in the internal memory in the mentioned relay boards 1A to 1N is carried out via the dedicated line 156. The other PCs (electronic terminals) 1321, 1322, 1421, 1422, 1423 except the mentioned PC 1323 for maintenance also have the same function as the foregoing PC 1323 for maintenance.

In addition, right of making a reference to the electronic data is managed by means of an IP of the Internet in order to prevent the information from being flowed out to any person other than those previously permitted. The mentioned electronic data are concealed by means of encryption (encoding) of the Internet in order to prevent the electronic data being tapped on the mentioned Web communication nets 153, 154.

What is claimed is:

1. A power system management method comprising:
changing a function of an equipment control apparatus from outside of said equipment control apparatus via a secure communication, where said equipment control apparatus, configured to control facility equipment, is being provided on a side of said facility equipment, said facility equipment comprising a power system; and
obtaining internal information about said equipment control apparatus via a Web communication to monitor a state of said power system from said internal information, where a monitoring control apparatus is being provided outside of the equipment control apparatus,
wherein the secure communication is a higher security communication than the Web communication.

2. The power system management method according to claim 1, wherein different communication lines are provided for the secure communication and the Web communication of the monitoring control apparatus.

3. The power system management method according to claim 2, wherein, after conducting a confirmatory communication via a communication line for the secure communication, the function of said equipment control apparatus is changed via said Web communication from outside of said equipment control apparatus.

4. The power system management method according to claim 2, wherein, as to the function of the equipment control apparatus exerting any effect at least on operation of the power system, the function of said equipment control apparatus is changed from outside of said equipment control apparatus via a communication line for the secure communication.

5. The power system management method according to claim 2, wherein the equipment control apparatus comprises an internal memory to which access is performed via a communication line for the secure communication and a common memory to which access is performed via said Web communication.

6. The power system management method according to claim 1, wherein the function of said equipment control apparatus is changed from at least one of a product supply-side base that supplies at least one of said facility equipment and said equipment control apparatus, and a power supply-side base.

7. A power system management system comprising:
an equipment control apparatus that controls facility equipment and that is provided on a side of the facility equipment, the facility equipment comprising a power system; and
a monitoring control apparatus that is provided outside of said equipment control apparatus and that obtains internal information about said equipment control apparatus, wherein the monitoring control apparatus operates via a Web communication to monitor a state of said power system from said internal information, and wherein a communication system of higher security than the Web communication for the monitoring control apparatus is provided to change, from outside of said equipment control apparatus, a function of said equipment control apparatus, wherein an electronic terminal of at least one of a product supply-side base that supplies at least one of said facility equipment and said equipment control apparatus, and a power supply-side base, is used to change, from the outside of said equipment control apparatus, the function of the equipment control apparatus.

8. The power system management system according to claim 7, wherein a communication line is used in the communication system of the higher security, and wherein the communication line is a dedicated line built between the electronic terminal of the at least one of said product supply-side base and power supply-side base, and said equipment control apparatus.

9. The power system management system according to claim 8, wherein said communication line, depending on a switch, makes a connection between the electronic terminal of the at least one of said product supply-side base and power supply-side base, and said equipment control apparatus, and wherein the switch is configured to turn on and off and is artificially controlled.

10. The power system management system according claim 9, wherein said switch is provided in at least one of said product supply-side base and power supply-side base and on the side of said equipment control apparatus, and wherein, depending on said switch, the electronic terminal of at least one of said product supply-side base and power supply-side base and said equipment control apparatus are connected to each other.

11. The power system management system according to claim 9, wherein said switch is provided in each of said product supply-side base and power supply-side base and on the side of said equipment control apparatus, and wherein, depending on the switches of the product supply-side base, the power supply-side base and the equipment control apparatus, one of the electronic terminals of said product supply-side base, said power supply-side base and said equipment control apparatus are connected to each other.

12. The power system management system according to claim 9, wherein said switch is provided in each of said product supply-side base and power supply-side base and on the side of said equipment control apparatus, and wherein, depending on all of the switches in said respective bases and the switch on the side of mentioned equipment control apparatus, at least one of the electronic terminals of said respective bases and said equipment control apparatus are connected to each other.

13. The power system management system according to claim 7, wherein said equipment control apparatus comprises a function enabling to change the function of said equipment control apparatus via said Web communication from the outside of said equipment control apparatus after conducting a confirmatory communication via said communication system.

14. The power system management system according to claim 7, wherein the function of the equipment control apparatus exerting an effect at least on operation of the power system is changed via said communication system.

15. The power system management system according to claim 7, wherein:

said equipment control apparatus comprises a control processing unit (CPU) managing the function, said CPU comprises an internal memory and a common memory, said internal memory is capable of being accessed via said communication system, and said common memory is capable of being accessed via said Web communication.

16. The power system management system according to claim 15, wherein the common memory is only for reading with respect to the access via said Web communication.

17. A power system management system comprising:

an equipment control apparatus controlling facility equipment;

a monitoring control apparatus acquiring information about the equipment control apparatus, where the monitoring control apparatus is remote from the equipment control apparatus;

a change control apparatus changing settings of the equipment control apparatus;

a web communication network transmitting data to and from the monitoring control apparatus and the equipment control apparatus; and a dedicated communication network transmitting data to and from the equipment control apparatus and the change control apparatus, wherein the change control apparatus is an electrical terminal located in at least one of a product supply-side base that supplies at least one of said facility equipment and said equipment control apparatus, and a power supply-side base, wherein the monitoring control apparatus is an electrical terminal remote from the equipment control apparatus and, wherein the equipment control apparatus comprises a common memory storing information about the equipment control apparatus being provided to the monitoring control apparatus and an internal memory storing information being changed by the change control apparatus, and wherein, when the equipment control apparatus receives a confirmation via the dedicated communication network, the equipment control apparatus permits the change control apparatus to change the settings of the equipment control apparatus.

\* \* \* \* \*